Nov. 9, 1926.
C. J. HOLLAND
DRAFT GEAR
Filed Jan. 2, 1924
1,606,576
3 Sheets-Sheet 3
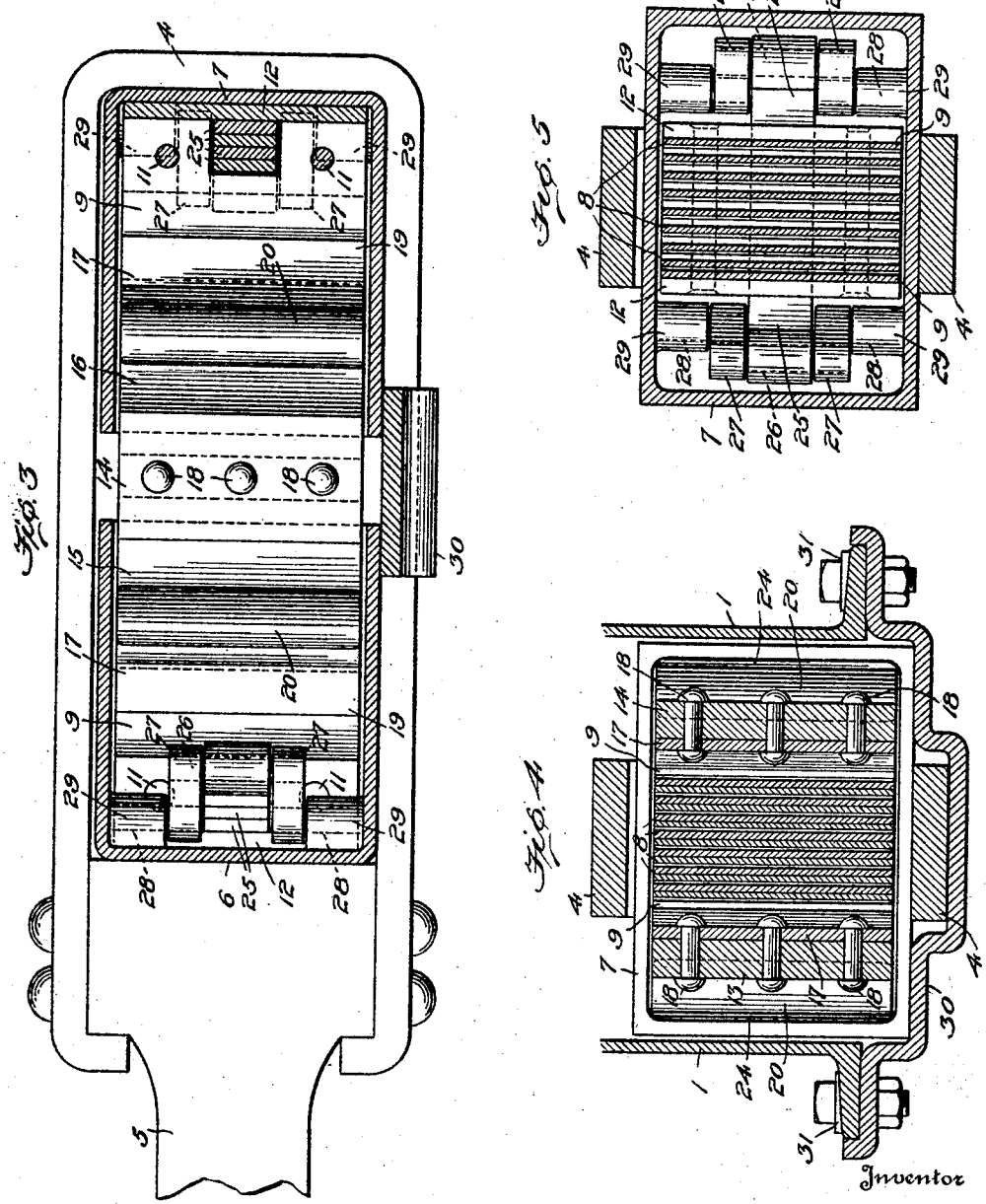

Patented Nov. 9, 1926.

1,606,576

UNITED STATES PATENT OFFICE.

CYRUS JONATHAN HOLLAND, OF CHICAGO, ILLINOIS.

DRAFT GEAR.

Application filed January 2, 1924. Serial No. 683,949.

The invention relates to shock absorbing mechanism, and more particularly to that type designed for use in connection with railway car draft rigging.

One of the principal objects of the invention, broadly stated, is to provide a shock absorbing unit which can be readily positioned within the limits prescribed in car construction, said unit involving a series of friction elements arranged to permit of relatively long travel of the gear with a resulting increase of exceedingly high shock absorbing capacity.

Particularly stated, the invention has for one of its principal objects the provision of a friction draft gear including a plurality of intercalated plates yieldingly mounted in adjacent sections of the casing and capable of being energized while frictionally resisting the shocks imparted to the gear, said energized plates acting to effect the initial release of the gear and being relatively movable with respect to the section of the casing in which they are mounted.

Another object of the invention is to provide a shock absorbing mechanism of exceedingly high capacity involving two series of plates having their inner portions intercalated for frictional and spring resistance, the outer ends of each series of plates being rigidly united in greater spaced relation than the thickness of the plates, means being provided for flexing the inner free portions of the plates whereby they are caused to move in frictional engagement throughout the length of travel of the gear, said means including oppositely disposed cam-like members which act to gradually increase the frictional resistance and spring action of the plates as the gear is moved to closed position.

Another object of the invention is to provide a friction shock absorbing mechanism for railway draft rigging which will smoothly transmit the forces to the gear with a gradually increasing resistance, said mechanism including relatively movable casings operable between suitable stop members or draft lugs, means including a series of longitudinally disposed plates carried by each casing and intercalated at their inner ends, means for rigidly uniting each series of plates at their outer ends, means including a plurality of rollers and cooperating wedging faces for frictionally engaging the plates and progressively energizing them to effect initial movements of the casings upon release of the gear, and means interposed between each casing and its respective series of plates for permitting relative movement therebetween, said last named means involving a spring adapted to move the intercalated inner ends of the plates from frictional engagement for restoring the same to normal position.

The invention further consists in the production of a durable construction of shock absorbing mechanism which can be readily fitted within the draft rigging pocket, the two part casing of the gear serving to effectively house and support advantageously located friction and spring elements whereby they can be maintained in service condition with comparatively small cost and minimum labor.

There are other objects of the invention which will appear from the more detailed description thereof when taken in connection with the accompanying drawings which have been chosen to illustrate an embodiment of the invention.

In the drawings:

Figure 3 is a vertical longitudinal sectional view on the line 3—3 of Figure 1, showing the draft yoke and portion of the coupler in side elevation.

Figure 4 is a vertical transverse sectional view on the line 4—4 of Figure 1, viewed in the direction of the arrows.

Figure 5 is a vertical transverse sectional view on the line 5—5 of Figure 1, viewed in the direction of the arrows, the center or draft sills being omitted.

Figure 1:
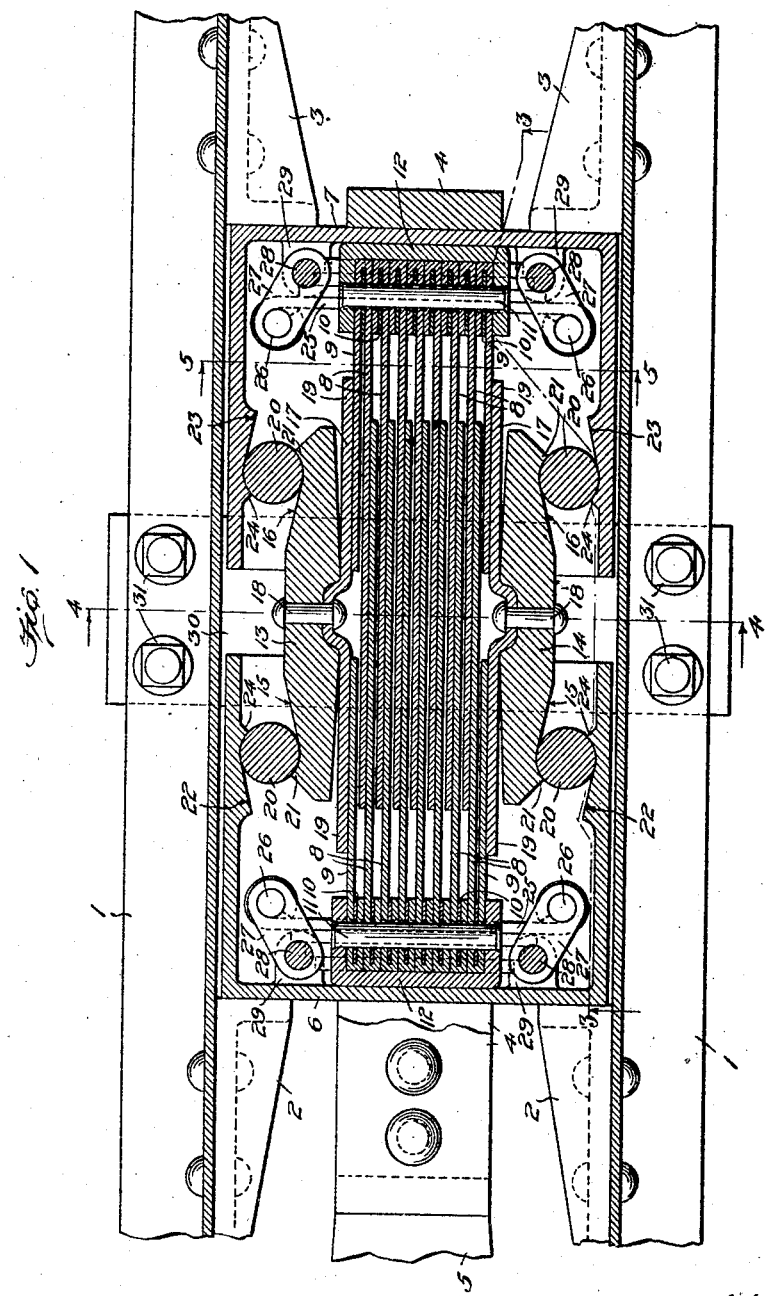
Figure 1 is a view in horizontal section of shock absorbing mechanism constructed in accordance with my invention, shown applied to a railway car draft rigging, said mechanism being shown in open or normal position.

Referring to the drawings in which similar reference characters designate corresponding parts in the several views, the invention is shown embodied in a shock absorbing mechanism positioned within the draft rigging pocket formed between the draft or center sills 1—1 having connected thereto the front stop members 2—2 and rear stop members 3—3. A vertical yoke 4 is connected to the coupler 5, the casings housing the draft gear being mounted within the yoke and operable between the front and rear stop members with which they normally contact, as shown in Figure 1.

Figure 2:
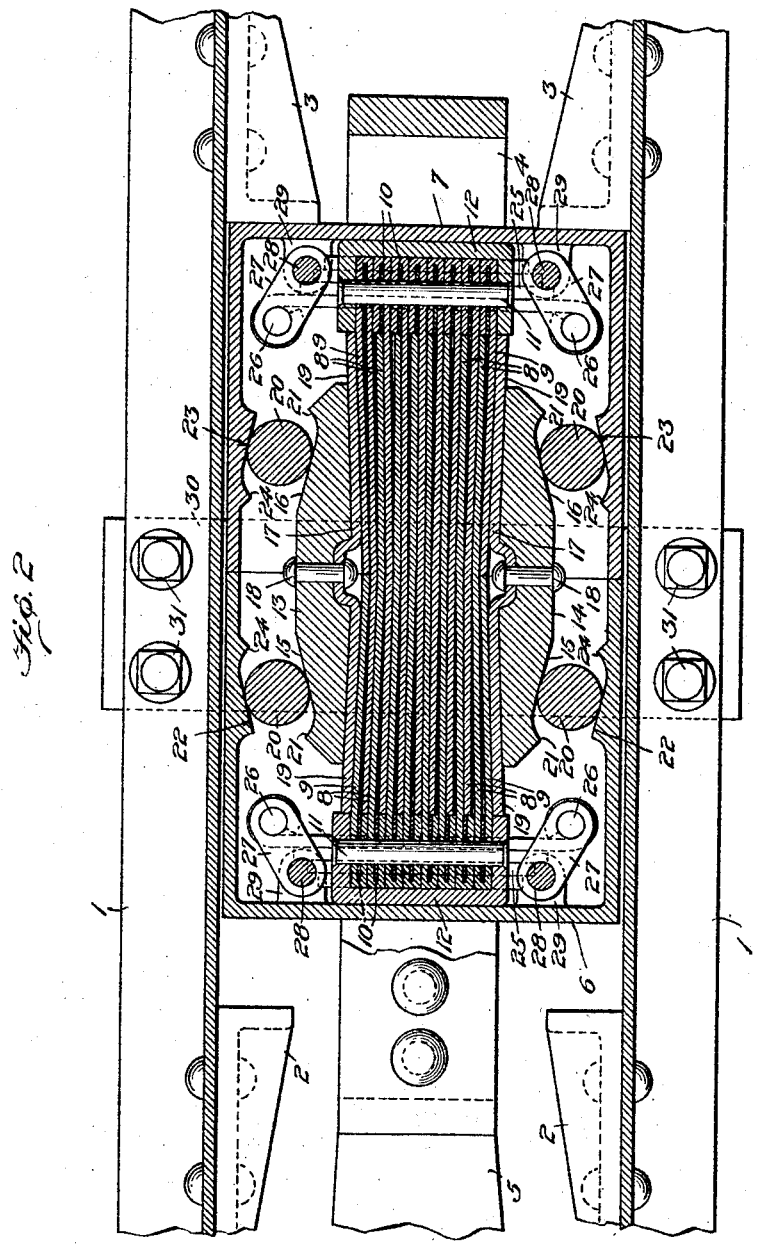
Figure 2 is a similar view showing the shock absorbing mechanism in closed position on buffing movement of the gear.

The shock absorbing mechanism includes a two-part casing composed of a front section 6 and rear section 7, said sections or casings being relatively movable and capable of contacting when the gear is closed, as illustrated in Figure 2. Each casing is designed to support a portion of the shock absorbing mechanism which coacts with the remaining portion of said mechanism and, as both of the cooperating series of elements in each portion of the gear are similar, a description of but one will be given with the same reference characters designating the several elements of the other.

The respective sections 6 and 7 of the two-part casing are each provided with a series of longitudinally disposed relatively thin spring metal plates 8 forming the friction elements, the inner portions of each series being yieldingly movable with respect to their outer ends and being intercalated with the adjacent series, as clearly shown in Figure 1. The outermost plates 9 of each series are preferably longitudinally alined and are adapted to abut intermediate the gear when it is closed, as shown in Figure 2. The several inside plates of each series are all preferably intercalated and sufficiently spaced to obtain a progressively increasing spring resistance up to the point of the gear going solid. The relative spacing of the plates 8 is effected by interposing thin plates or shims 10 thereby providing a relative spacing greater than the thickness of said plates 8 and permitting of considerable flexure in order to obtain a very strong spring resistance for initially releasing the gear very rapidly when the loads are removed.

The outer ends of each series of plates or friction elements 8 are rigidly connected together by means of pins 11 passing therethrough and firmly securing the same to the plate supporting member or block 12. Each plate may be bent back upon itself at its outer end, as shown, the space between the body portion of the plate and the bent back portion advantageously receiving the shim 10. The outer ends of the plates are firmly held between the opposite side walls of the member or block 12 in which walls the pin may be riveted or otherwise secured. It will be observed that two of the outermost plates 9 are provided with relatively long bent back portions whereby the intermediate or inside plates are maintained in relative uniform intercalated relation and the outer plates caused to operate in longitudinal alinement, thereby obtaining the most effective distribution of the loads throughout the gear.

Cooperating with the friction plates are oppositely arranged follower members 13 and 14, said members each being in the form of a cam block having cam faces 15 and 16. Each follower member is preferably connected to a plate member 17 by means of rivets 18, said plate member having normally longitudinally alined wing portions 19, as shown in Figure 1, said wing portions operating substantially in parallel relation to the plates 8 and more especially the outermost plates 9 with which they contact in both closed and open positions of the gear. The plate members 17 are yieldingly operable with respect to the respective cam blocks 13 and 14, said plates members flexing to the position shown in Figure 2 when transmitting the forces developed in the closing of the gear. The intermediate portion of each plate member is preferably let into a cutaway portion provided in the cam block whereby it is effectively seated against the opposite shoulders of said cutaway portions for resisting the longitudinal forces imparted thereto and reducing the shear strains upon the rivets 18 to a minimum. The outer ends of the ring portions of the plate members are adapted to contact the adjacent portion of the oppositely disposed walls extending from the cross members 12, when the gear is closed, thereby permitting a portion of the overload of the gear to be taken by said members which, by reason of their opposed inward deflection under compression only serve to increase the frictional resistance of the several plates.

A roller 20 operates upon the cam faces 15 and 16 respectively, said rollers being prevented from moving beyond said faces by means of the lip extensions 21. The rollers are maintained against said cam faces by means of wedge portions 22 and 23 provided respectively upon opposite walls of the sections 6 and 7 of the two-part casing, the inner opposed faces of said wedge portions paralleling respectively the cam surfaces 15 and 16 of the follower members or cam blocks 13 and 14. Lip extensions 24 at the inner portions of the wedge faces coact with the aforesaid lip extensions 21 in maintaining the rollers in operative position for relative movement along the diametrically opposed surfaces in imparting the loads to the intercalated plates and permitting their release. The rollers preferably extend substantially the full width of the casing, as best shown in Figure 3.

The means mounting each series of friction plates for relative movement with respect to the casing section by which it is supported comprises a leaf spring 25 having its opposite ends coiled about and connected to pins 26, the opposite ends of which pins are pivotally connected to link members 27. The opposite ends of the link members 27 are pivotally connected by means of pins 28 to projections or lugs 29 formed integral with the casing. The foregoing construction permits of relative movement between the end wall of the casing and the cross member 12 supporting the plates, said leaf spring, however, while assisting in the release of the gear also acting to resist the loads imparted through said end wall and directed to the cross member which latter in turn is caused to gradually increase the resistance by reason of the friction plates being moved into closer contact through the action of the wedging surfaces causing the rollers to force the follower members toward each other.

In receiving the buffing loads the forward section 6 of the casing moves rearwardly, the rollers and cooperating wedge and cam surfaces acting to force the follower members 13 and 14 toward each other thereby causing the deflection of the plates from their normal comparatively loose or free relation to firm contacting position for establishing the friction resistance of the gear. The continued inward movement of the section 6 and the corresponding relative fixed position of the section 7 against the rear stop members causes the gear to completely close, as indicated in Figure 2. On release the spring and intercalated friction plates which have been considerably flexed by the preceding operation have been energized sufficiently to cause the outward movement of the follower members 13 and 14, said outward movement causing the rollers to force the front casing section forwardly which movement is sufficient to separate the end wall of said casing section from the cross member 12 thereby energizing the leaf-spring and causing it to immediately respond by returning the cross member into contact with said forwardly traveling end wall and in so doing positively effect the separation of the plates from frictional contact. A very rapid and at the same time decidedly smooth release is effected through the coaction of the plates and leaf spring. On draft it will be observed that the same operation of the several elements contained within the casing section 7, takes place, the forward casing section being held against relative movement by the front stop members or draft lugs 2—2.

The casing sections of the gear and more especially the outer side portions thereof at their inner opposed ends, are supported upon a cross strap or bar 30 the outer ends of which are bent upwardly and outwardly and then again upwardly, as best shown in Figure 4 for snugly fitting the draft sills or center sills. Bolt and nut connections 31 firmly secure the strap to said sills. The intermediate portion of the strap is depressed to receive the yoke, said portion acting to support and guide the same in its movement under service conditions. It will be noted that the upwardly extending portions of the strap adjacent the portions supporting opposite sides of the casing sections are disposed in vertical alinement with the car sills for further guiding the casing. While I have shown my invention incorporated in a friction shock absorbing unit and applied to a railway draft rigging having a vertical yoke, it will be understood that it is applicable to other draft rigging arrangements such as the Farlow type of construction.

In the present application of the invention it will be observed that the casing sections are relatively closely spaced from the center sills and that a large part of the load is imparted through the rollers which are longitudinally alined with the respective front and rear stop members.

Having thus described my invention, what I claim and desire to secure by Letters Patent, is:

1. A shock absorbing mechanism for railway draft rigging involving a casing composed of relatively movable sections, a series of longitudinally arranged intercalated friction elements having their outer ends rigidly connected at the front and rear ends of the casing, said connected ends being relatively movable with respect to an adjacent casing section and disposed in spaced relation for permitting flexure of the inner intercalated portions of the plates, means operable by either of said casing sections for flexing said inner portions of the elements for frictionally contacting each other, and means for causing relative longitudinal movement of the friction elements during their flexure.

2. A shock absorbing mechanism for railway draft rigging involving a casing having a plurality of relatively movable sections, a series of friction plates mounted in each section having their inner end portions intercalated with the inner end portions of an adjacent series of plates carried by another casing section, said intercalated plate portions being normally positioned for flexure on closing movement of the mechanism, and means including said casing sections for imparting relative movement to the plates, said means also serving to flex the plates into progressively increasing frictional contact during said movement.

3. A shock absorbing mechanism for railway draft rigging including a casing composed of relatively movable sections, a series of yieldingly associated friction members mounted in each section, the outer end portions of each series being rigidly connected in spaced relation and the inner end portions of adjacent series being intercalated, means for imparting relative sliding movement to said members, and means for flexing the members into increasingly yielding and frictional contact during the sliding movement.

4. A shock absorbing mechanism for railway draft rigging including a casing composed of relatively movable sections, friction members carried by said sections, the friction members of each section having their outer ends rigidly connected in spaced relation and their inner ends intercalated with adjacent friction members and arranged for yielding and frictional contact, means for imparting relative sliding movement to said intercalated friction members, and means for moving the inner portions of said members into frictional engagement during the relative sliding movement thereof, said last named means acting to yieldingly energize the inner portions of the friction members, said energized portions serving to separate the members from frictional engagement upon the release of the loads imparted to the mechanism.

5. A shock absorbing mechanism for railway draft rigging involving a plurality of yieldingly associated relatively flat friction members having portions thereof intercalated, means for imparting relative sliding movements to said members, and means for moving the members into frictional contact during the sliding movement thereof, said last named means acting to energize the yieldingly associated members, said energization acting to initially separate the members from frictional contact.

6. A shock absorbing mechanism for railway draft rigging involving a pluralilty of yieldingly associated relatively flat friction members, means for imparting relative sliding movement to said members, and means for yieldingly moving the members into frictional contact during the relative sliding movement thereof, said last named means acting to energize the yieldingly mounted friction members for effecting the initial separation thereof upon the release of the loads transmitted to the mechanism.

7. A shock absorbing mechanism for railway draft rigging including relatively movable casings, a plurality of yieldingly mounted friction members positioned therein, means movably connecting said friction members to the casings and adapted to maintain the same in relative fixed relation thereto, and means for moving portions of the yieldingly mounted members into progressively increasing frictional engagement, said last named means acting to energize the yieldable friction members for effecting the initial separation thereof and corresponding relative movement of the casings upon release of the loads, the means movably connecting the friction members and an adjacent casing being caused to operate to move the friction members from engagement and restore them to normal position.

8. A shock absorbing mechanism for railway draft rigging including relatively movable casings each having inner opposed wedging faces, a plurality of yieldingly mounted intercalated friction members interposed between said casings, means yieldingly connecting the outer ends of the friction members to an adjacent casing for maintaining the same in relatively fixed relation thereto, and means including a plurality of rollers and cam blocks associated with the wedging faces of the casings for moving the yielding friction members into progressively yielding and friction contact upon relative movement of the casings toward each other, said last named means energizing the yieldable friction members for effecting the initial separation thereof and corresponding relative movement of the casings upon release of the loads, the means yieldingly connecting the outer ends of the friction members to an adjacent casing being energized by said relative movements of the casings for subsequently restoring the friction members to normal position following their initial separation.

9. A shock absorbing mechanism for railway draft rigging comprising relatively movable casings each having inner opposed wedging faces, a plurality of yieldingly mounted intercalated friction members, means for rigidly connecting the outer ends of said members, means including a spring for yieldingly associating said connected members with an adjacent casing, and means operable between the wedging faces of the casing and opposite sides of the yieldingly mounted intercalated friction members for progressively increasing the yielding and frictional resistance of said members upon closure of the mechanism, said friction members being energized by the closure movement for effecting the initial separation thereof and relative movement of one of the casings, said movement of the casing energizing the spring yieldingly associating the connected ends of the friction members with an adjacent casing for restoring the friction members to normal position following their initial separation.

10. A shock absorbing mechanism for railway draft rigging involving relatively moveable casings having opposed wedging faces, a plurality of yieldingly mounted intercalated friction members, the outer ends of which are joined together for relative movement with respect to an adjacent casing, means for maintaining the outer connected ends of said friction members in relatively fixed relation to the adjacent casing, and means for moving the intercalated portions of the friction members into progressively increasing yielding and frictional engagement upon closing movement of the mechanism, said last named means including a plurality of rollers and associated cam blocks, each of said cam blocks having a yieldable member contacting the opposite sides of the intercalated friction members.

11. In a railway draft rigging, the combination with center sills, of a coupler, a yoke connecting said coupler, stop members connected to the center sills, and a shock absorbing mechanism interposed between said stop members, said mechanism involving relatively movable casings contacting said stop members, a plurality of intercalated friction members mounted in said casings and yieldingly associated for effecting the initial separation thereof and relative movement of the casings upon release of the loads, means operable between the sides of the casing adjacent the center sills and the opposite sides of the intercalated plates for progressively increasing the yielding and frictional resistance of said plates upon closing movement of the mechanism, and means yieldingly maintaining said plates in relatively fixed relation with an adjacent casing, said last named means being energized upon relative movement of the casings for restoring the friction members to normal position and the casings against the stop members.

12. In a railway draft rigging, the combination with center sills, of a coupler, a yoke connecting said coupler, stop members connected to the center sills, a shock absorbing mechanism interposed between said stop members, said mechanism involving relatively movable casings contacting said stop members, a plurality of intercalated friction members mounted in said casings and yieldably associated for effecting the initial separation thereof and relative movement of the casings upon release of the loads, means operable between the sides of the casing adjacent the center sills and the opposite sides of the intercalated plates for progressively increasing the yielding and frictional resistance of said plates upon closing movement of the mechanism, means connected to said center sills for supporting the inner ends of the relatively movable casings, and means yieldingly connecting the outer end of each casing with the adjacent ends of the intercalated friction members, said last named means acting to separate said members and restore the casings to normal contacting position with the stop members.

13. A shock absorbing mechanism for railway draft rigging involving a casing composed of relatively movable sections, a series of longitudinally arranged intercalated friction elements, means operable by any one of said casing sections for flexing portions of the friction elements into frictional engagement, and means for causing relative movement of the friction elements during their flexure.

14. A shock absorbing mechanism for railway draft rigging comprising relatively movable casings, a plurality of yieldingly mounted friction members positioned therein and yieldably carried by the end walls thereof, means acting to move said friction members longitudinally in interfitting relation, and wedge means within the casings outwardly of said friction members for flexing the latter into progressively increasing frictional engagement during longitudinal movement thereof.

15. A shock absorbing mechanism for railway draft rigging comprising relatively movable casings, series of intercalated plates having spring connection with the ends of the casings, means for moving a casing with respect to the other for sliding the plates relatively in a longitudinal direction, and means located outwardly of the series of plates and inwardly of the respective casings for applying lateral pressure against opposite sides of the plates and flexing the same for progressively increasing the frictional resistance during longitudinal movement.

16. In a draft rigging, a shock absorbing mechanism comprising similar casings, similar series of intercalated plates extending longitudinally thereof and having spring connection with the ends thereof, means for moving a casing longitudinally with respect to the other for sliding the plates, pressure members located outwardly of the series of plates and extending into both casings, and wedge means for forcing said pressure members laterally toward each other for flexing the plates and progressively increasing the frictional engagement thereof simultaneously with longitudinal movement thereof.

17. In a draft rigging, a shock absorbing mechanism comprising casings, a series of spring plates within each casing and projecting into the other, the adjacent ends of said plates being arranged in interfitting relation, spring means passing through the outer ends of said plates and anchored to the ends of the casings for permanently connecting the series of plates with the casings while permitting relative longitudinal movement, means for moving the casings and plates relatively in a longitudinal direction, and means located between the series of plates and the casings for applying lateral pressure to the former for flexing the same and progressively increasing the frictional engagement thereof simultaneously with the longitudinal movement.

18. A shock absorbing mechanism for draft rigging, comprising a pair of similar casings, a series of friction plates mounted within each casing and projecting into the other, the inner ends of said friction plates being arranged in interfitting relation, spring means extending transversely of the outer end portion of each casing and connected with the adjacent series of friction plates for permitting yielding of the series with respect to the casing within which it is mounted; means for moving the casings relatively, and wedge operated means within the respective casings engaging against opposite sides of the interfitting friction plates for flexing the same into engagement and progressively increasing the friction proportionate to the degree of longitudinal movement.

19. In a draft rigging, shock absorbing means comprising a pair of casings, a series of friction plates within each casing extending longitudinally thereof, the plates carried by both casings being in interfitting relation, transversely arranged leaf springs within the ends of the casings and shackled thereto, means connected with the springs and engaging the friction plates for permitting yielding thereof as a unit with respect to the casing within which they are mounted, means for moving the casings relatively in a longitudinal direction, and cam means for applying lateral pressure upon the interfitting plates for flexing the same into frictional engagement simultaneously with longitudinal movement.

20. In a railway draft rigging, shock absorbing means comprising a pair of casings capable of relative movement, series of intercalated spring plates resiliently mounted within the respective casings, shoe members located outwardly of the friction plates and extending into both casings, the end portions of said shoe members being formed within the casings with cam surfaces, the confronting portions of the casings being formed with cam surfaces, means for moving the casings relatively in a longitudinal direction, and means interposed between the cam surfaces on the shoe members and casings for moving the shoe members toward each other simultaneously with longitudinal movement of the casings toward each other for flexing the spring plates into frictional engagement, the cam surfaces being arranged to increase the frictional resistance proportionately to the longitudinal movement.

In testimony whereof I affix my signature.

CYRUS JONATHAN HOLLAND.